US005636429A

United States Patent [19]

Croombs

[11] Patent Number: 5,636,429

[45] Date of Patent: Jun. 10, 1997

[54] METHOD AND APPARATUS FOR PROVIDING PIECES OF FLEXIBLE MATERIAL FROM A LENGTH THEREOF

[75] Inventor: Denis Croombs, Hampshire, Great Britain

[73] Assignee: Guiness Brewing Worldwide Limited, London, Great Britain

[21] Appl. No.: 560,949

[22] Filed: Nov. 20, 1995

Related U.S. Application Data

[63] Continuation of Ser. No. 189,433, Jan. 31, 1994, abandoned.

[51] Int. Cl.[6] .................... B23P 23/00

[52] U.S. Cl. .................... 29/564.6; 29/776; 29/785; 29/792; 83/439; 83/856

[58] Field of Search .................... 29/785, 792, 417, 29/564.6, 564.1, 773, 776; 83/439, 444, 856

[56] References Cited

U.S. PATENT DOCUMENTS

| | | | |
|---|---|---|---|
| 1,629,170 | 5/1927 | Matthias et al. | 29/564.6 X |
| 3,194,098 | 7/1965 | Kimball et al. | 29/564.6 X |
| 3,242,566 | 3/1966 | White | 29/417 X |
| 3,461,535 | 8/1969 | Avery, Jr. et al. | 29/564.6 X |
| 3,466,731 | 9/1969 | Acton et al. | 29/564.6 X |
| 3,888,151 | 6/1975 | Beckerer et al. | 83/439 X |
| 4,118,915 | 10/1978 | Swenson | 29/564.6 X |
| 4,171,850 | 10/1979 | Eriksson | 29/417 X |
| 5,201,117 | 4/1993 | Wright | 29/417 X |
| 5,343,608 | 9/1994 | MacDonald | 29/417 X |

FOREIGN PATENT DOCUMENTS

| | | |
|---|---|---|
| 1180010 | 8/1968 | United Kingdom . |
| 1361334 | 4/1972 | United Kingdom . |

*Primary Examiner*—Joseph M. Gorski
*Attorney, Agent, or Firm*—McCormick, Paulding & Huber

[57] ABSTRACT

A method and apparatus for providing pieces of flexible material from a length thereof (such as tubes 30 from plastics tubing 4) has a rotor 6 with a port 9 through which the tubing 4 is fed. Rotation of the rotor about its axis 7 displaces an end 4' of the tubing over a cutter 15 to cut the tube piece. The tube piece 30 may be gripped by jaws 23 on a turret 20 and carried to a transfer station 31 at which the tube piece 30 may be picked up by jaws 71 on a vertically displaceable head 60 of a locating unit 3. The head 60 rotates with a turret 56 and is displaced vertically under cam control 62, 63 for fitting an end 30A of the tube piece into a component, such as an open topped container 40, in a seat 52 beneath the head 60. The container 40 may be conveyed to the seat 52 in a filling and sealing line for forming a beverage package.

26 Claims, 3 Drawing Sheets

METHOD AND APPARATUS FOR PROVIDING PIECES OF FLEXIBLE MATERIAL FROM A LENGTH THEREOF

This is a continuation of U.S. application Ser. No. 08/189,433 filed on Jan. 31, 1994, and now abandoned.

TECHNICAL FIELD AND BACKGROUND ART

The present invention relates to a method and apparatus for providing pieces of flexible material from a length thereof. The invention was primarily developed for use with plastics material such as small-bore tubing supplied as relatively long or continuous lengths, typically from supply reels, from which predetermined length pieces are cut for subsequent use. It will be appreciated however that the invention is not intended to be restricted to such use and may, with advantage, be applied to materials other than plastics tubing, for example cable or wire.

Modern production techniques frequently call for a high rate of throughput for articles and commodities. This is particularly so for beverage packages such as cans or other containers for alcoholic or non-alcoholic beverages where a filling line may be expected to run at a rate, for example, in excess of 500 containers per minute. In our development of beverage packages there is a requirement for a piece of plastics tube of predetermined length to be supplied and form a part of each package. The purpose of such tube is the subject of our co-pending Patent Application Number 92 23 519.1 in which the tube is fitted to a hollow plastics insert within an open-topped container to extend upwardly within the container so that when the container is charged with beverage containing gas in solution and sealed under pressure, subsequent opening of the container develops a pressure differential between pressure in the hollow insert and pressure in the head space of the container causing gas and/or liquid to be expelled from the insert through the upstanding tube for the development of froth in the head space. In the production of the aforementioned packages we have determined that the most economically viable means for providing the tubes for the beverage packages is for such tubes to be cut to length from a bulk supply of the tubing so that pieces of tube of predetermined length are available on demand for automatic handling to be applied to the beverage containers. There is a need however for an apparatus for, and a method of, providing pieces of flexible material, such as plastics tubes, from a length of such material which is relatively simple and efficient in operation and which is particularly suitable for providing such pieces at relatively high rates; it is an object of the present invention to satisfy this need.

STATEMENTS OF INVENTION AND ADVANTAGES

According to the present invention there is provided apparatus for providing pieces of flexible material from a length of said material which comprises a cutting station having a rotor and means for rotating the rotor about an axis, the rotor having a guide which is rotatable therewith and is radially offset from said axis; means for displacing the length of material longitudinally through said guide for a free end part length of the material to project from the guide, and a cutter relative to which the rotor is rotatable so that during rotation of the rotor and material in the guide thereof, the material engages the cutter for a piece of predetermined length to be cut from the free end of the material, and wherein following said cut the displacing means indexes the material to displace it longitudinally for a further free end part length thereof to project from the guide for cutting a further said piece.

Further according to the present invention there is provided a method of providing pieces of flexible material from a length of said material which comprises displacing the length of material longitudinally through a guide in a rotor so that a free end part length of the material projects from the guide; rotating the rotor about an axis with the guide radially offset from the axis so that said free end part length of the material is displaced circumferentially and during said circumferential displacement passing the material over a cutter to cut the free end part length from the material and form a piece thereof.

By the invention it is envisaged that the flexible material will, typically, be supplied as a continuous length from a drum or reel and have its free end part length subjected to circumferential displacement by a rotor and during such displacement the material passes over a cutter by which a piece is cut from the end of the material. By this technique such pieces can be cut successively in a simple and efficient manner and at relatively high speeds by appropriately synchronising the indexing of the material through the guide of the rotor so that each piece is of predetermined length. Furthermore it is generally recognised that high rotational speeds for a rotor are far more easily achieved, are more controllable and more reliable in comparison with reciprocating blade-type cutters which have hitherto been proposed for cutting lengths of material. The length of material is flexible to the extent that its free end can be rotated by the rotor without impairing the required characteristics of the material and the material should have adequate rigidity to permit its longitudinal displacement, for example by rollers, for indexing the material through the guide. Also, depending upon the orientation of the apparatus, the material may require sufficient rigidity for the free end part length (which is to be cut to form the piece) to support its own weight, for example in an arrangement where the strip is displaced vertically through the guide for its free end part length to project in an upstanding condition from the guide. As previously mentioned, the invention was primarily developed for use in cutting pieces from small-bore plastics tubing and, for convenience, will hereinafter be discussed in relation to such use although it is to be realised that the invention may be applied, with advantage, to other types of material lengths such as cable, wire or plastics filaments.

Although the rotor may be rotated intermittently, for high speed production it is preferred that the rotor is continuously rotatable and in either case it will be usual for a single piece of tube to be cut from the free end of a supply tubing with each rotation of the rotor.

Preferably the supply tubing is located in a track part for its longitudinal displacement towards the guide. The track part may have an end that is substantially co-axial with the axis of the rotor and is axially spaced from the rotor so that during its longitudinal displacement the supply tubing moves along the track part and on leaving the said end of the track part is displaced radially relative to the track part over its instant part length between the guide and the track part. With such an arrangement the supply tubing may be longitudinally displaceable through a guide tube which is rotatable with the rotor and provides communication between the track part and the guide.

The cutter is preferably in the form of a cutting edge or blade with which the plastics tubing engages to be cut during rotation of the rotor. The cutting edge may be mounted so that it can be indexed to present a fresh cutting edge part to the tubing as another part becomes warn. If required the cutter can present a circular cutting edge and may be driven to rotate about its axis, continuously or intermittently, during rotation of the rotor.

Preferably retaining means is provided which engages the free end part length of the supply tubing for the tubing to be cut between the retaining means and the guide. This retaining means will generally be in the form of a gripper or jaws which initially engages the free end of the supply tubing and subsequently holds the piece that is cut from the tubing. The retaining means may form part of transfer means for engaging the free end part length of the supply tubing which projects from the guide and serves to transfer the piece that is cut from the supply tubing to a predetermined station.

The aforementioned transfer means is preferably synchronised to engage the free end part length of the supply tubing immediately prior to said tubing being cut. In a preferred arrangement the transfer means has a turret rotatable about an axis remote from the rotor axis and by which the previously mentioned retaining means is displaced about a circle part of the circumference of which extends through a region that substantially coincides with part of the circumference of the circle through which the supply tubing is displaced by the rotor and in which region the rotor and cutter are arranged to cut the tubing. The retaining means is synchronised so that during rotation of the turret it engages the supply tubing as the retaining means enters the region and carries the cut piece of tube from the region to transfer it to the predetermined station. Generally the turret axis will be substantially parallel with the rotor axis. To facilitate high speed handling of the tube pieces, the turret may have a plurality of retaining means such as jaws or grippers disposed in a circumferentially spaced array and a plurality of cutting stations may be spaced circumferentially about the turret so that tube pieces emanating from the respective cutting stations are carried by retaining means selected to be synchronised with those respective cutting stations.

To facilitate automatic mechanical handling of a piece cut from the supply tubing, piece locating means can be provided by which a piece transferred to the aforementioned predetermined station by the transfer means may, for example, be engaged with a component of which the tube piece is to form part. The locating means may be arranged to displace the tube piece from the predetermined station to attach that piece with or locate that piece on or in a particular component. For example the tube piece (or other piece if not of tubular form) may be positioned and held by the locating means to the component to be secured by adhesion or welding. In a preferred arrangement, however, in which the tube pieces are fitted to hollow inserts for developing froth in beverage packages of the kind previously discussed, the tube piece may be handled by the locating means to engage as a press-fitting with a seating of the component insert—for example a free end of the tube piece may be press-fitted into a socketed port in the insert or onto a tubular spigot of the insert. The locating means may have retaining means (or further retaining means where transfer means including retaining means is provided) for engaging the tube piece at the predetermined station of the transfer means and carrying that piece into its engagement with, or location on or in the particular component. The retaining means of the locating means will usually comprise a gripper or jaws by which the tube piece is held. Where the transfer means includes retaining means such as a gripper or jaws, the further retaining means of the locating means is preferably synchronised to engage the tube piece that is transferred to the predetermined station by the transfer means prior to the retaining means of the transfer means releasing that particular tube piece. Where the transfer means comprises a rotatable turret as previously mentioned, it is preferred that the locating means comprises a second turret rotatable about an axis remote from (and usually parallel with) the axis of the turret of the transfer means. By this arrangement the retaining means of the locating means may be displaced about a circle, part of the circumference of which extends through a further region which substantially coincides with the predetermined station of the transfer means and in which further region the further retaining means of the second turret is synchronised to engage a tube piece carried by the retaining means of the transfer means prior to the retaining means of the transfer means releasing that particular tube piece to the further retaining means of the locating means to carry the tube piece during rotation of the second turret to a fitting station at which the piece is engaged with or positioned on or in a particular component such as the previously mentioned package insert. The second turret will usually have a plurality of the, or the further, retaining means such as grippers or jaws disposed in a circumferentially spaced array and which retaining means are arranged to sequentially engage successive tube pieces located at the predetermined station of the transfer means to carry those tube pieces successively to the fitting station. The locating means conveniently has seating means displaceable therewith and which seating means are intended to locate and carry components to which tube pieces carried by the retaining means of the locating means are to be applied. With this in mind the aforementioned turret of the locating means may have a circumferentially spaced array of seats associated one with each of the retaining means of that turret so that a component located by a said seat can have applied thereto the tube piece carried by the retaining means associated with that seat. For example, each seat may be intended to locate and carry an open-topped container within which is located an insert to which the tube piece is to be press-fitted through the open top of the container by displacement of the retaining means. Desirably the open-topped container will be substantially cylindrical and have a seating to which the tube piece is to be press-fitted located substantially on the axis of and within the container and the locating means may comprise a probe which is displaceable into the open top of the container and carry the tube piece for an end of that piece to be displaced axially relative to the container and press-fitted into engagement with the seating. Such an arrangement is advantageous since cylindrical containers may be positioned on the seats to accurately locate the axes of those containers with respect to the intended line of displacement of the respective probes to ensure that the free end of a tube piece will be displaced axially of the container to engage with the seating (thereby alleviating the necessity of rotationally orientating a container relative to its seat or possibly rotationally orientating the position of an insert having the seating within the container to ensure that the displacement of the free end of the tube piece will be in appropriate alignment to engage with the seating).

DRAWINGS

One embodiment of the present invention as applied to apparatus for providing tube pieces from a length of tubing and fitting said pieces as part of beverage packages will now be described, by way of example only, with reference to the accompanying illustrative drawings in which.

DETAILED DESCRIPTION OF DRAWINGS

The apparatus illustrated is intended for cutting a piece of flexible plastics tubing, typically having an inside diameter of 1 millimetre and an outside diameter of 2 millimetres, from what may be regarded as a continuous length of such tubing supplied from a reel or drum and fitting the tube piece that is formed within an open topped container prior to the container moving along a filling line to be charged with beverage and sealed to form a beverage package (for example of the kind discussed in our co-pending Patent Application No. 92 23 519.1). The apparatus comprises a cutting station 1, a tube piece transfer unit 2 and a tube piece locating unit 3.

Figure 2:
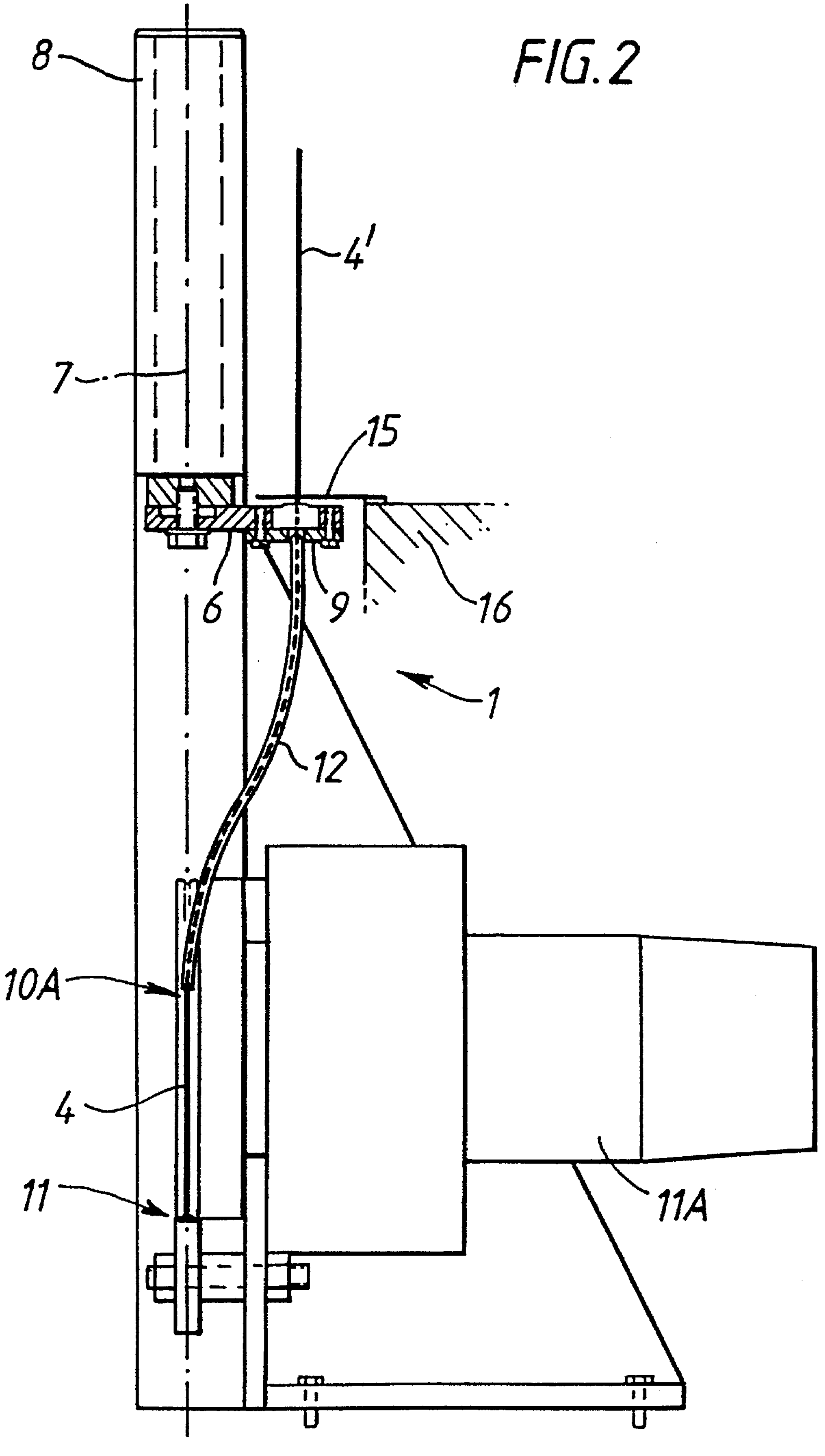
FIG. 2 is an end elevation of a cutting station in the apparatus of FIG. 1.

The cutting station 1 is intended to cut tube pieces 30 of predetermined length from plastics tubing 4 supplied from a drum or reel 5. The cutting station has a rotor 6 which is rotatable about a vertical axis 7 by a drive unit 8. The rotor 6 carries a guide port 9 spaced radially from its axis 7. Tubing 4 from the supply reel 5 is fed to and through the guide port 9 by way of a track 10 between indexing rollers shown generally at 11. An end 10A of the track 10 from which the tubing 4 emerges is located substantially on the axis 7 and a guide tube 12 extends between said end of the track 10 and the guide port 9. The guide tube 12 rotates with the rotor 6 about the axis 7 and the tubing 4 extends through the guide tube to the guide port 9 and the tube 12 provides a convenient track by which the tubing is supported and displaced radially progressively from the axis 7 to the guide port. The rollers 11 displace the tubing 4 longitudinally of its length and through the guide port 9 so that a free end part 4' of the tubing projects from the guide port of the rotor 6 in an upstanding condition as shown in FIG. 2.

Located above and adjacent to the plane of rotation of the rotor 6 is a cutting blade 15 carried by a mounting 16. The blade 15 projects into the circular path subscribed by the tubing 4 as that tubing is rotated with the rotor 6, as a consequence the end part 4' of the tubing is cut off to form a tube piece 30 as the tubing engages the blade 15. The rollers 11 are indexed by a drive unit 11A to displace the tubing 4 intermittently and through predetermined lengths so that successive free end part lengths 4' of the tubing are presented to the cutter 15 for a tube piece 30 of predetermined length to be cut on each rotation of the rotor 6 as the latter is rotated continuously. The cutter 15 may be a fixed blade or a circular blade that is rotated continuously or intermittently on its mounting 16.

Figure 3:
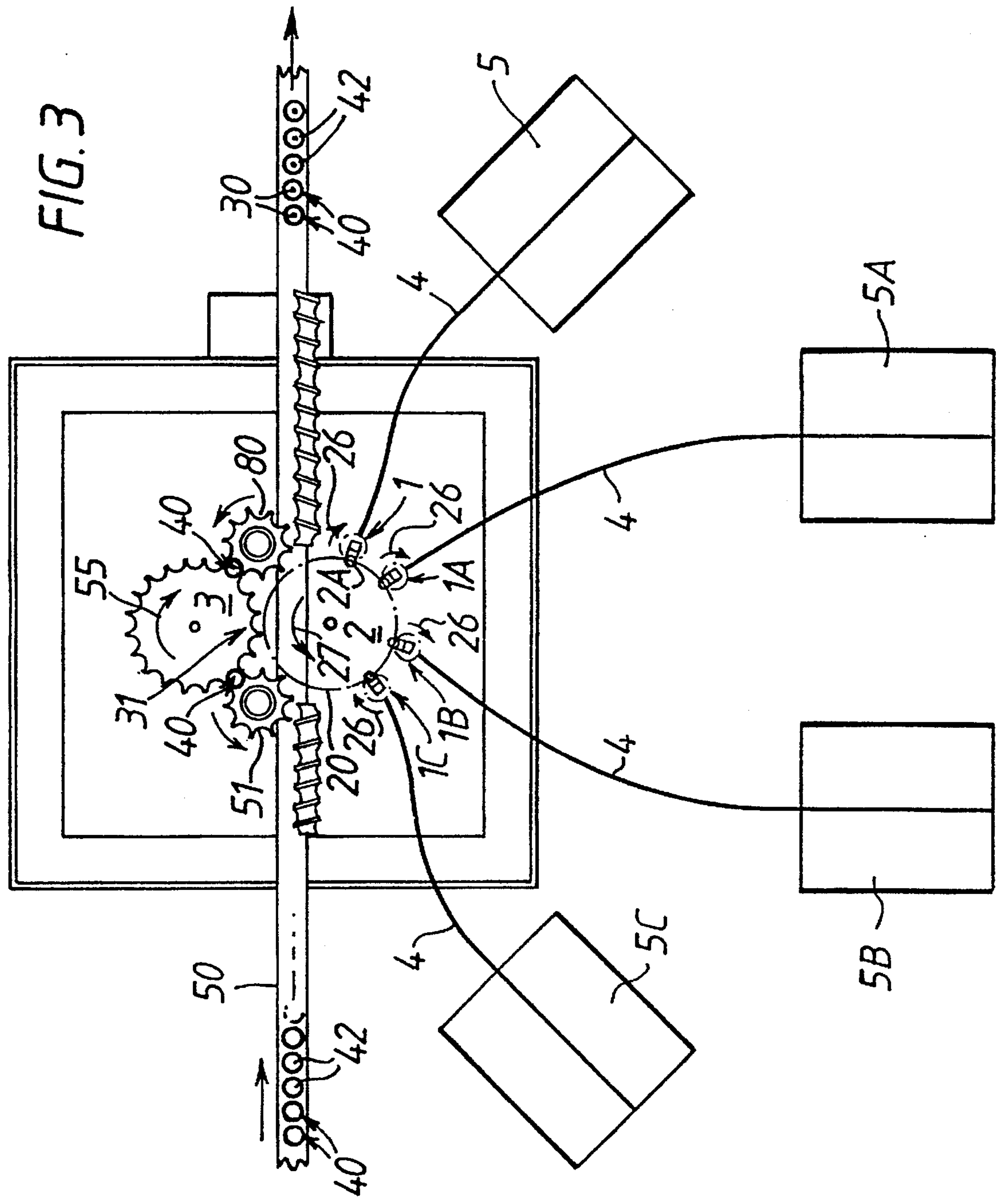
FIG. 3 is a schematic plan view of the apparatus.

The transfer unit 2 has a turret 20 which is continuously rotated by a drive unit (not shown) about a vertical axis 21 spaced from the axis 7. Carried on the turret 20 at a position spaced radially from its axis 21 is a tube piece retaining unit 22 having radially outwardly presented opposed jaws 23 which are openable and closable by a control unit 24 (such as a fluid pressure operated piston and cylinder device, an electrical solenoid or otherwise) on the turret 20. The jaws 23 are carried by the turret to subscribe a circle, part of the circumference of which coincides with a region 2A of the circle subscribed by the rotor port 9 in which region the tubing 4 engages the blade 15. In FIG. 3 the rotor 6 is rotated about its axis 7 in a clockwise direction (as indicated by the arrow 26) to cut the tubing while the turret 20 is rotated about its axis 21 in a counterclockwise direction (as indicated by the arrow 27).

The cutting station 1 and transfer unit 2 are synchronised so that as the free end 4' of the tubing enters the aforementioned region 2A and approaches the cutting blade 15, the jaws 23, in an open condition, of the retaining unit 22 are carried by the rotating turret to approach and straddle the tube end 4' where the jaws 23 close and grip the tube end 4' immediately before that tube end engages the cutter 15. This gripping action of the jaws 23 conveniently stablises the tubing 4 as it is cut at a position between the guide port 9 and the jaws 23. Following cutting of the tubing 4, the cut piece 30 of the tube is retained in the closed jaws 23 and carried by the rotating turret 20 to a transfer station 31.

To facilitate supply of tube pieces 30 by the transfer unit 2 to the transfer station 31 at a high frequency, the transfer unit 2 has associated therewith four of the aforementioned cutting stations which are spaced circumferentially about the turret 20 as indicated at 1, 1A, 1B and 1C in FIG. 3. Each of the four cutting stations is constructed and operated in a similar manner and supply tubing 4 for the stations 1A, 1B and 1C is derived from reels 5A, 5B, and 5C respectively. In addition the turret 20 carries twenty of the retaining units 22 which are circumferentially spaced on the turret and each is constructed and operates in a similar manner to that previously discussed. The four cutting stations are synchronised with rotation of the twenty retaining units 22 so that during rotation of the turret 20 each cutting station provides a tube piece 30 to the jaws 23 of every fifth transfer unit 24 in the circumferential array for sequential delivery to the transfer station 31.

The locating unit 3 is intended for the purpose of assembling tube pieces 30 provided at the transfer station 31 with open topped containers 40 in a beverage packaging line. The containers are in the form of light metal alloy cans having a substantially cylindrical wall 41 forming the open top 42. Fitted within the bottom of each container 40 is a hollow insert 43. The insert 43 is intended to promote froth development on opening a package formed when the container is charged with beverage containing gas in solution and sealed. When such a sealed package is opened, gas and/or liquid is intended to be injected from the hollow insert 43 into the beverage in the container to liberate gas from solution and effect the aforementioned froth development—such inserts are well known in the art as, for example, discussed in our European Patent Specification A-0 227 213. The insert 43 is provided with a seating 44 that is located on the axis of the cylindrical container and directed towards the open top 42. A tube piece 30 is to be fitted to the seating 44 for the purpose of controlling the aforementioned froth development as discussed in our co-pending Patent Application No. 92 23 519.1. The containers 40 with the fitted inserts 43 and in an upstanding condition are fed successively by a conveyor 50 and star wheel 51 (rotating anti-clockwise in FIG. 3) to be accommodated in a seat 52 carried by a horizontal platform 53 of the locating unit 3. The platform 53 is rotated by a drive unit (not shown) about a vertical axis 54 spaced from the axes 7 and 21 and in a clockwise direction as indicated by the arrow 55 in FIG. 3. Twenty seats 52 are provided on the platform 53 spaced circumferentially about the axis 54.

Located above the platform 53 is a turret 56 which rotates about the axis 54 in unison with the seats 52. The turret 56 carries twenty tube fitting heads 60 which are spaced circumferentially about the axis 54 and positioned one each vertically above the seats 52. The heads 60 are mounted on the lower ends of vertical rods 61 having rolling cam followers 62 which engage in a cam track 63 on a cylindrical stationary core 64 of the locating unit. During rotation of the turret 56 and seats 52 the cam followers 62 follow the cam track 63 to impart vertical displacement to the rods 61 and thereby to the heads 60 so that for each rotation of the turret 56 the heads 60 exhibit a predetermined cycle of vertical displacement.

Each head 60 has a vertical probe 70 at the bottom end of which is carried a set of radially outwardly directed opposed jaws 71 which are openable and closable by a control unit 72 on the head (in a similar manner to the control unit 24 on the retaining unit 22). During rotation of the turret 56 the jaws 71 of the heads 60 are displaced along a common circle concentric with the axis 54 and which circle coincides with the transfer station 31 of the transfer unit 2. The rotation of the turret 56, vertical displacement of the head 60 and actuation of the jaws 71 is synchronised with the transfer of a tube piece 30 by the transfer unit 2 to the station 31 so that the jaws 71 are open and are moved by the rotating turret 56 to straddle a tube piece 30 gripped by the jaws 23 of a retaining unit 22 approaching the transfer station 31. At the transfer station 31 the jaws 71 are closed to grip the tube piece 30 and the jaws 23 of the retaining unit 22 and opened to release the tube piece 30 captured by the jaws of a head 60 as the turret 20 and turret 56 continue to rotate in counterwise directions. The jaws 71 of a head 60 engage a tube piece 30 at the transfer station 31 at a position towards the lower end of that tube piece and with the head 60 retracted vertically (under control of the cam follower 62 and cam track 63) to provide sufficient clearance for a container 40 to be accommodated in the seat 52 beneath the head 60 and the lower end of the tube piece 30 carried thereby.

A container 40 is transferred by the star wheel 51 to be accommodated on a seat 52 so that the axis of the container and the seating 44 of its insert 43 are in vertical axial alignment with the bottom end 30A of a tube piece 30 carried by the head 60 associated with that particular seat. During unified rotation of the turret 56 and seats 52, a tube piece 30 carried by a head 60 from the transfer station 31 is displaced vertically downwardly under control of the cam follower 62 and track 63 so that the probe 70 of that head enters the open top 42 of the container which underlies that head to displace the bottom end 30A of the tube piece along the axis of the container.

Figure 1:
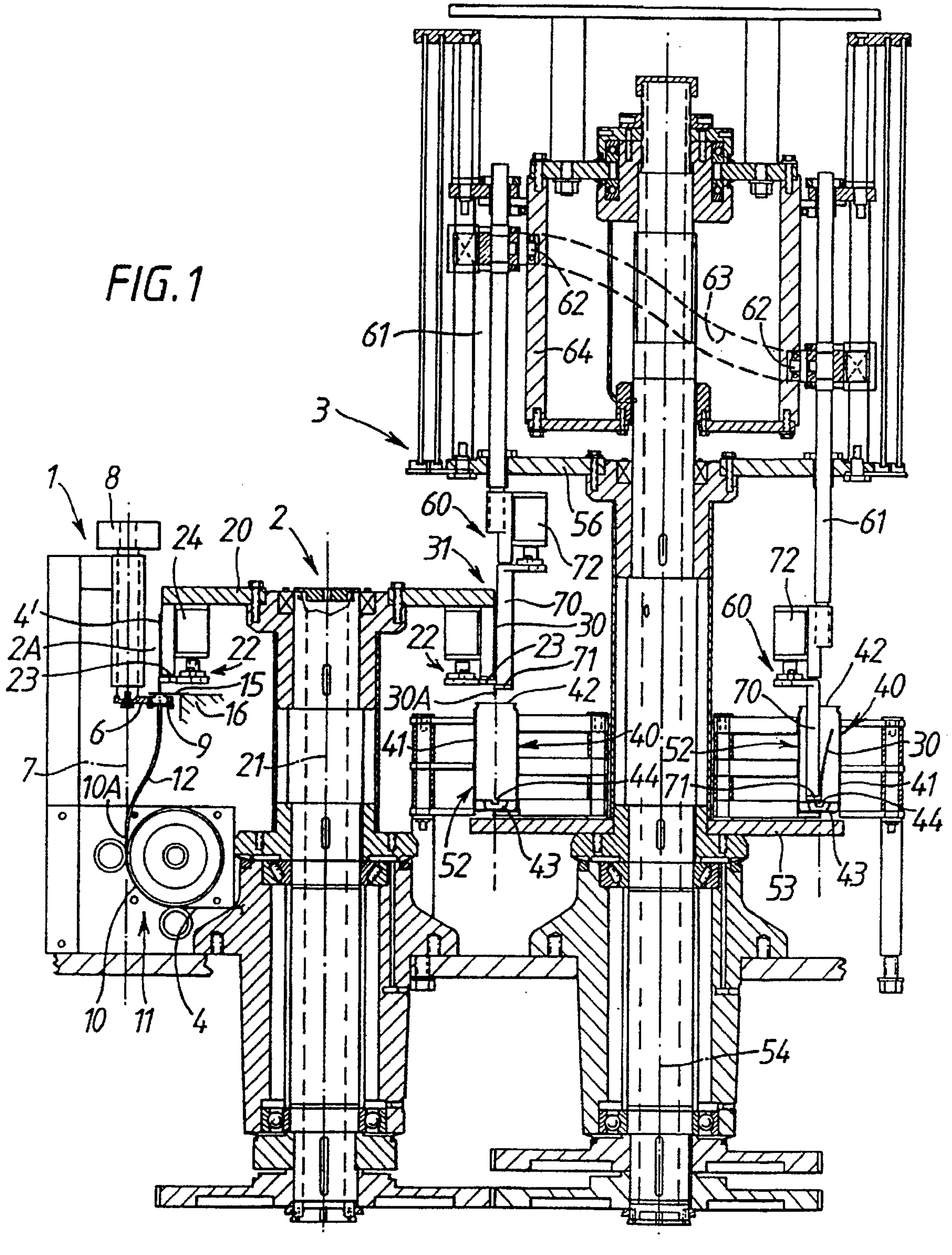
FIG. 1 is a side elevation of the apparatus in section.

Continued rotation of the turret 56 and vertical displacement of the head downwardly causes the bottom end 30A of the tube to be press fitted into engagement with the seating 44 of the insert 43 as shown at the righthand side of the locating unit 3 in FIG. 1. The seating 44 of the insert may be in the form of a socket into which the bottom end 30A of the tube piece is fitted or may be in the form of a spigot on which the bottom end 30A of the tube piece is received. Following fitting of the tube piece 30 to the seating 44 and during continued rotation of the turret 56 and seat 52, the jaws 71 are opened to release the tube piece 30 (which is retained within the container 40) and the head 60 retracts vertically from the container as the head approaches the transfer station 31 in readiness to receive a further tube piece 30 from the transfer unit 2. By locating the seating 44 on the axis of the cylindrical container 40 and displacing the bottom end 30A of the tube piece along that axis into engagement with the insert, it will be appreciated that there is no necessity to provide any particular rotational orientation between the insert 43 and the container 40 or between the container 40 and the seat 52. Following fitting of the tube piece 30 to the insert and withdrawal of the probe 70 from the container, the container is displaced from its seat 52 by a star wheel 80 back onto the conveyor 50 by which it may be transferred successively to a beverage filling station and container sealing station.

The transfer unit 2 and heads 60 of the locating unit 3 are synchronised so that tube pieces 30 are fitted successively to the open topped containers as they are fed into the seats 52 of the platform 53. For convenience of description a container 40 has been shown in FIG. 3 located in the seat 52 which underlies a head 60 at the transfer station 31. However, in practice of the illustrated embodiment, and as will be appreciated from FIG. 3, a seat 52 will receive an open topped container only when the jaws 71 of the head 60 which overlies that seat have already picked up a tube piece 30 from the transfer station 3 and also a container fitted with the tube 30 will be removed from its seat 52 by the star wheel 80 before that container reaches the transfer station 31; consequently a container will not be located in a seat 52 at the time when the head 60 associated with that particular seat passes through the transfer station 31 to pick up a tube piece 30.

I claim:

1. Apparatus for obtaining and processing pieces of flexible material from a length of said material which comprises a cutting station having a rotor and means for rotating the rotor about a rotor axis, the rotor having a guide which is rotatable therewith and is radially offset from said rotor axis; a track part relative to which the rotor rotates, said track part having an end adjacent to the rotor which end is axially spaced from the rotor; a bulk source of said length of material remote from said rotor and relative to which the rotor rotates; means for displacing the length of material longitudinally from said source, along the track part and, said end of the track part and said guide such that a free end of said material projects from said guide; means for guiding said material laterally relative to said axis as it is displaced from said end of the track part to said guide; a cutter relative to which the rotor is rotatable so that during rotation of the rotor and material in the guide thereof, the material engages the cutter such that a piece of predetermined length is cut from the free end of the material; and means for indexing the displacing means after said cut to displace said material such that a further free end thereof projects from the guide; transfer means for transferring the piece cut from said length of material to a predetermined station, said transfer means comprising retaining means and drive means for displacing the retaining means along a path having a region which coincides with part of the circumference of a circle through which the material is displaced by the rotor and in which region the rotor and cutter cut the material, said retaining means being synchronized in its displacement by the drive means to engage said free end of the material prior to said material being cut, to maintain said engagement while the material is cut between the retaining means and the guide as the retaining means is displaced along said region of the path, and to maintain said engagement with the piece cut from the material and carry that cut piece along said path to the predetermined station remote from said circumference of the circle.

2. Apparatus as claimed in claim 1 in which the rotor is continuously rotatable.

3. Apparatus as claimed in claim 1 in which for each rotation of the rotor a single said piece of flexible material is cut from the length of material.

4. Apparatus as claimed in claim 1 wherein said means for guiding comprises a guide tube which is rotatable with the rotor and provides communication between said end of the track part and the guide.

5. Apparatus as claimed in claim 1 in which the cutter comprises a cutting edge with which the free end of material engages.

6. Apparatus as claimed in claim 5 in which the cutting edge is substantially circular and is mounted to be rotatable about an axis.

7. Apparatus as claimed in claim 6 and comprising means for rotating the cutter during rotation of the rotor.

8. Apparatus as claimed in claim 1 in which the means for displacing the length of material longitudinally comprises roller means rotation of which effects said displacement and which roller means is synchronised with the rotor to index said material in its longitudinal displacement for cutting.

9. Apparatus as claimed in claim 1 in which the retaining means comprises jaws by which the material is held.

10. Apparatus as claimed in claim 1 in which the transfer means comprises a turret rotatable about an axis remote from the rotor axis and by which said retaining means is displaced along said path which is a circle, part of the circumference of which circle extends through said region which substantially coincides with part of the circumference of the circle through which the material is displaced by the rotor.

11. Apparatus as claimed in claim 10 in which the turret axis is substantially parallel with the rotor axis.

12. Apparatus as claimed in claim 10 in which the turret has a plurality of said retaining means disposed in a circumferentially spaced array and wherein a plurality of said cutting stations are circumferentially spaced about the turret for pieces emanating from each said cutting station to be carried by at least one said retaining means in the array selected to be synchronised with that said cutting station.

13. Apparatus of claim 1 and further including piece locating means by which a piece transferred to said predetermined station is applied to a component with which said piece is to form an assembly.

14. Apparatus as claimed in claim 13 in which the locating means includes means to displace the piece from said predetermined station and press-fit that piece into engagement with said component.

15. Apparatus as claimed in claim 13 in which the locating means comprises further retaining means for engaging the piece at said predetermined station and carrying that piece into its assembly with said component.

16. Apparatus as claimed in claim 15 in which the further retaining means of the locating means comprises jaws by which the piece is held.

17. Apparatus as claimed in claim 15 in which a first of said further retaining means of the locating means is synchronised to engage the piece transferred to the predetermined station by the transfer means prior to said retaining means of the transfer means releasing the said piece.

18. Apparatus as claimed in claim 17 in which the transfer means comprises a first turret rotatable about an axis remote from the rotor axis and by which said retaining means is displaced along a circular path and wherein the locating means comprises a second turret rotatable about an axis remote from the axis of said first turret of the transfer means and by which second turret said further retaining means of the locating means is displaced about a circle, part of the circumference of which circle extends through a further region which substantially coincides with said predetermined station and in which further region said further retaining means of the second turret is synchronized to engage a piece carried by said retaining means of the transfer means prior to the second retaining means of the transfer means releasing the said piece for the further retaining means to carry that piece during rotation of the second turret to a fitting station at which the piece is assembled with said component.

19. Apparatus as claimed in claim 18 in which the axis of the second turret is substantially parallel with the axis of the first turret of the transfer means.

20. Apparatus as claimed in claim 18 in which the second turret has a plurality of said further retaining means disposed in a circumferentially spaced array and which said plurality of further retaining means sequentially engage successive pieces located at the predetermined station to carry said pieces successively to the fitting station.

21. Apparatus as claimed in claim 18 in which said second turret has seating means rotatable therewith to locate and carry a said component for assembly with a said piece carried by the further said retaining means.

22. Apparatus as claimed in claim 21 in which the second turret has a plurality of said further retaining means disposed in a circumferentially spaced array and which said plurality of further retaining means sequentially engage successive pieces located at the predetermined station to carry said pieces successively to the fitting station, and wherein the second turret has a circumferentially spaced array of seats associated one with each of said further retaining means so that a component located and carried on a said seat can have assembled therewith a piece carried by the said further retaining means associated with said seat.

23. Apparatus as claimed in claim 18 wherein said further retaining means is displaceably mounted on the second turret and controlled so that during rotation of that turret said further retaining means and a piece carried thereby is displaced successively for the piece to be assembled with the component at said fitting station, said further retaining means to release the piece to the component and said further retaining means to withdraw from the assembly of the component and said piece in preparation for said further retaining means to engage a further piece at the predetermined station.

24. Apparatus as claimed in claim 23 in which displacement of said further retaining means on the second turret is determined by relative displacement between cam track means and cooperating cam follower means effected during rotation of the second turret.

25. Apparatus as claimed in claim 13 in which the piece locating means comprises a seat for receiving an open-topped substantially cylindrical container which container has a seating located substantially on the axis thereof and with which seating a free end of the piece is to engage, and wherein the locating means comprises a head which carries said piece for an end thereof to be displaced along the axis of a container in said seat for said end of the piece to be fitted into engagement with said seating in the container.

26. Apparatus as claimed in claim 1 in which the material comprises plastics tubing.

* * * * *